US012673225B2

(12) United States Patent
Li et al.

(10) Patent No.: US 12,673,225 B2
(45) Date of Patent: Jul. 7, 2026

(54) MASK

(71) Applicant: Ping Li, Shanghai (CN)

(72) Inventors: Ping Li, Shanghai (CN); Xiangyu Zhang, Shanghai (CN)

(73) Assignee: Ping Li, Shanghai (CN)

( * ) Notice: Subject to any disclaimer, the term of this patent is extended or adjusted under 35 U.S.C. 154(b) by 560 days.

(21) Appl. No.: 18/199,062

(22) Filed: May 18, 2023

(65) Prior Publication Data

US 2023/0372749 A1      Nov. 23, 2023

(30) Foreign Application Priority Data

May 18, 2022    (CN) ......................... 202210548064.X

(51) Int. Cl.
A62B 23/02        (2006.01)
A62B 18/08        (2006.01)
(Continued)

(52) U.S. Cl.
CPC ............ *A62B 23/025* (2013.01); *A62B 18/08* (2013.01); *B01D 46/543* (2013.01); *B32B 5/06* (2013.01);
(Continued)

(58) Field of Classification Search
CPC ............... A63B 23/025; B01D 46/543; B01D 2275/10; B32B 7/0905; B32B 2250/02;
(Continued)

(56) References Cited

U.S. PATENT DOCUMENTS

2003/0205231 A1* 11/2003 Shigematsu ........... A41D 13/11
                                                               128/206.24
2019/0076680 A1* 3/2019 Liu .................... A41D 13/1138
                              (Continued)

FOREIGN PATENT DOCUMENTS

CN          2608045 Y      3/2004
CN        201630275 U     11/2010
                  (Continued)

OTHER PUBLICATIONS

Machine assisted English translation of CN2608045Y obtained from https://worldwide.espacenet.com on May 17, 2023, 5 pages.
(Continued)

*Primary Examiner* — Brandy S Lee
*Assistant Examiner* — Rohan Patel
(74) *Attorney, Agent, or Firm* — WARNER NORCROSS + JUDD LLP

(57) ABSTRACT

A mask is provided according to the present application. The mask includes a mask body with filtering performance and a flexible support frame. The support frame is arranged in the mask body and connected to the mask body. The mask body includes a first filter area corresponding to the support frame and a second filter area surrounding the support frame. While the mask is in use, the support frame supports the mask body, so that the first filter area and at least part of the second filter area are spaced apart from the user's face. When the mask according to the present application is worn, the support frame separates the whole first filter area and at least part of the second filter area of the mask body from the wearer's face, which significantly increases the filter area of the mask and makes the wearer's breathing smoother.

10 Claims, 5 Drawing Sheets

(51) Int. Cl.
B01D 46/54 (2006.01)
B32B 5/06 (2006.01)
B32B 7/05 (2019.01)
(52) U.S. Cl.
CPC ............ B32B 7/05 (2019.01); *B01D 2275/10*
(2013.01); *B01D 2279/40* (2013.01); *B32B*
*2250/02* (2013.01); *B32B 2307/73* (2013.01);
*B32B 2571/00* (2013.01)
(58) Field of Classification Search
CPC . B32B 2307/73; B32B 2307/728; B32B 3/02;
B32B 3/085; B32B 5/26; B32B 5/02;
A62B 18/02; A62B 18/08; A62B 23/00;
A62B 18/025; A62B 23/02; A41D 13/11;
A41D 13/1192
See application file for complete search history.

(56) References Cited

U.S. PATENT DOCUMENTS

| | | | | |
|---|---|---|---|---|
| 2022/0062670 | A1* | 3/2022 | Maddox | A62B 23/025 |
| 2022/0151318 | A1* | 5/2022 | Kotecha | A41D 13/1161 |
| 2022/0241623 | A1* | 8/2022 | Ellison | A62B 23/025 |
| 2022/0331623 | A1* | 10/2022 | Wang | A62B 9/02 |
| 2022/0346471 | A1* | 11/2022 | Moon | D04H 1/4282 |
| 2023/0165323 | A1* | 6/2023 | Warikata | A41D 13/11 128/863 |
| 2024/0017099 | A1* | 1/2024 | Seok | A62B 18/025 |

FOREIGN PATENT DOCUMENTS

| | | | |
|---|---|---|---|
| CN | 202476508 U | 10/2012 | |
| CN | 106037090 A | 10/2016 | |
| CN | 106617393 A | 5/2017 | |
| CN | 107485080 A | 12/2017 | |
| CN | 208541712 U | 2/2019 | |
| CN | 111165934 A | 5/2020 | |
| CN | 111248547 A | 6/2020 | |
| CN | 212233233 U | 12/2020 | |
| CN | 213045357 U | 4/2021 | |
| CN | 113262402 A | 8/2021 | |
| CN | 214340314 U | 10/2021 | |
| CN | 214485322 U | 10/2021 | |
| CN | 114128942 A | * 3/2022 | .......... A41D 13/1161 |
| JP | 2022033639 A | 3/2022 | |
| KR | 20210153888 A | * 12/2021 | ............. A62B 18/08 |

OTHER PUBLICATIONS

Machine assisted English translation of CN106037090A obtained from https://worldwide.espacenet.com on May 17, 2023, 8 pages.
Machine assisted English translation of CN111248547A obtained from https://worldwide.espacenet.com on May 17, 2023, 10 pages.
Machine assisted English translation of CN114128942A obtained from https://worldwide.espacenet.com on May 17, 2023, 10 pages.
Machine assisted English translation of CN201630275U obtained from https://patents.google.com/patent on May 17, 2023, 3 pages.
Machine assisted English translation of CN213045357U obtained from https://worldwide.espacenet.com on May 17, 2023, 9 pages.
Machine assisted English translation of CN214340314U obtained from https://worldwide.espacenet.com on May 17, 2023, 7 pages.
Machine assisted English translation of JP2022033639A obtained from https://worldwide.espacenet.com on May 17, 2023, 13 pages.
Machine assisted English translation of CN106617393A obtained from https://worldwide.espacenet.com on Oct. 27, 2025, 12 pages.
Machine assisted English translation of CN111165934A obtained from https://worldwide.espacenet.com on Oct. 27, 2025, 13 pages.
Machine assisted English translation of CN113262402A obtained from https://worldwide.espacenet.com on Oct. 27, 2025, 10 pages.
Machine assisted English translation of CN1202476508U obtained from https://worldwide.espacenet.com on Oct. 27, 2025, 10 pages.
Machine assisted English translation of CN208541712U obtained from https://worldwide.espacenet.com on Oct. 27, 2025, 9 pages.
Machine assisted English translation of CN212233233U obtained from https://worldwide.espacenet.com on Oct. 27, 2025, 10 pages.
Machine assisted English translation of CN214485322U obtained from https://worldwide.espacenet.com on Oct. 27, 2025, 10 pages.
Machine assisted English translation of KR20210153888A obtained from https://worldwide.espacenet.com on Oct. 27, 2025, 10 pages.
Written Opinion and Search Report for related CN Application No. 202210548064.X dated Sep. 26, 2025, 8 pages.

* cited by examiner

MASK

CROSS REFERENCE TO RELATED APPLICATIONS

The present application claims priority to Chinese patent application No. 202210548064.X, titled "MASK", filed on May 18, 2022 with the Chinese National Intellectual Property Administration, the entire content of which is incorporated herein by reference.

RELATED FIELD

The present application relates to the field of sanitary products, and in particular to a mask.

BACKGROUND

As a sanitary product, a mask is generally worn to cover mouth and nose to filter air to be inhaled into the mouth and nose, so as to block harmful gases, droplets, and other substances. Therefore, the larger the effective filtering area of the mask, the better.

However, during usage of the conventional medical surgical mask in the prior art, only the area, corresponding to the nostrils, of the mask is spaced apart from the face, and most of the mask closely fits the face. The area closely fitting the face is impervious to gases and cannot be used as a filter, so that a filtering area of the mask is actually smaller.

SUMMARY

To solve the above technical problems, a mask is provided according to the present application. The mask includes a mask body with filtering performance; and a flexible support frame. The support frame is arranged in the mask body and connected to the mask body. The mask body includes a first filter area corresponding to the support frame and a second filter area surrounding the support frame. While the mask is in use, the support frame supports the mask body, so that the first filter area and at least part of the second filter area are spaced apart from the user's face.

In an embodiment, the support frame includes a first rod extending laterally, a second rod arranged below the first rod and extending laterally, and at least two connecting rods connected between the first rod and the second rod and laterally spaced apart. The first rod, the second rod, and the at least two connecting rods are combined as a closed shape.

In an embodiment, the closed shape is an isosceles trapezoid with a long bottom edge of the isosceles trapezoid being located above a short bottom edge.

In an embodiment, the support frame further includes a third rod extending laterally. The third rod is located between the first rod and the second rod, and is connected with the connecting rods.

In an embodiment, the mask further includes a gap filling strip adapted to fit with a nose wings. The gap filling strip is arranged on an inner side of the mask body and extends along an upper edge of the mask body.

In an embodiment, the gap filling strip includes two protrusions protruding inwards and a recess located between the two protrusions.

In an embodiment, the gap filling strip is made of closed cell-sponge or flexible plastic. In another embodiment, the gap filling strip may also be made of rubber.

In an embodiment, the mask further includes a deformable rod. The deformable rod is separated from the mask body and is adjacent to the first rod. A projection of the gap filling strip towards the mask body overlaps with at least part of the deformable rod.

In an embodiment, the deformable rod is arranged on a side, facing towards the second rod, of the first rod, and is located on an inner side of the connecting rods.

In an embodiment, the first rod includes a middle section which is part of the closed shape and lateral extension sections which are located outside the closed shape. The deformable rod extends laterally beyond the middle section of the first rod, but does not beyond the lateral extension section.

In an embodiment, the deformable rod is connected at least at middle thereof to the first rod at least at the middle.

In an embodiment, the mask body includes a first set of filter layers located on an outer side of the support frame and a second set of filter layers located on an inner side of the support frame. The first set of filter layers and the second set of filter layers are connected into a whole at an edges via an elastic wrapping strip.

In an embodiment, the first set of filter layers, the second set of filter layers and the wrapping strip are sewn together. The wrapping strip is coated with a flexible adhesive to seal sewing stitch.

In an embodiment, the first set of filter layers includes a filter membrane layer adjacent to the support frame and a first hydrophobic cloth layer adjacent to the filter membrane layer. The second set of filter layers includes a second hydrophobic cloth layer adjacent to the support frame and a hydrophilic cloth layer adjacent to the second hydrophobic cloth layer.

In an embodiment, the first set of filter layers and the second set of filter layers are connected together through multiple discretely distributed fixing points.

In an embodiment, multiple wrinkles are formed at edges of the mask body.

Compared with the prior art, the beneficial effects of the present application are as follows. When the mask according to the present application is worn, the mask body is supported by the support frame and protrudes outwards to form a cup shape, so that the whole first filter area and at least part of the second filter area of the mask body are spaced apart from the wearer's face, which significantly increases the filter area of the mask and makes the wearer's breathing smoother.

BRIEF DESCRIPTION OF THE DRAWINGS

The accompanying drawings described herein are used for providing a further understanding of the present application, and constitute a part of the present application. Exemplary embodiments of the present application and descriptions thereof are used for explaining the present application, and do not constitute any inappropriate limitation to the present application. In the drawings.

DETAILED DESCRIPTION

In order to make the objects, technical solutions, and advantages of the present application clearer, the technical solutions of the present application are described clearly and completely in conjunction with the specific embodiments and corresponding drawings of the present application hereinafter. It is apparent that the described embodiments are only some rather than all embodiments of the present application. Based on the embodiments of the present application, all other embodiments obtained by those skilled in the art without any creative work fall within the scope of protection of the present application.

In the present application, the term "inwards" or "inner" refers to a direction towards the wearer, and the term "outwards" or "outer" refers to a direction opposite to the term "inwards" or "inner".

Figure 1:
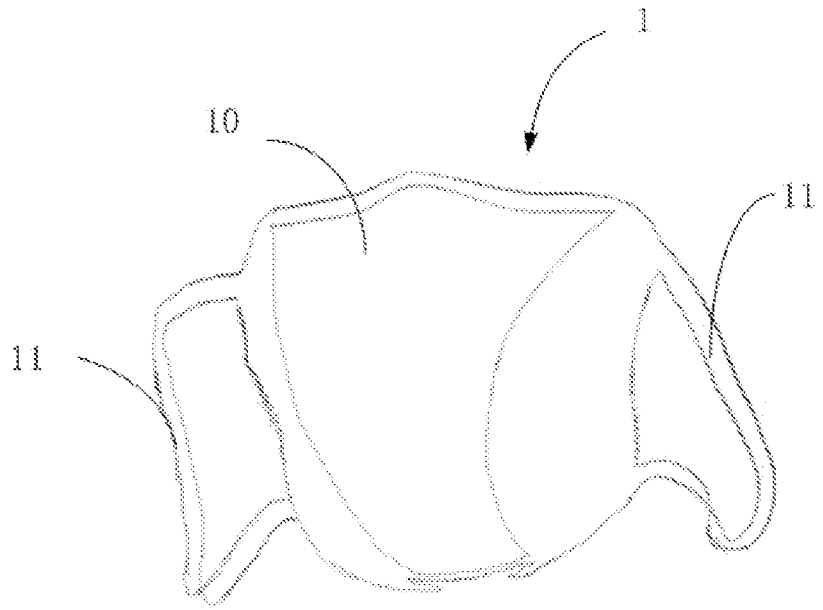
FIG. 1 schematically shows a perspective view of a mask according to an embodiment of the present application.
Figure 4:
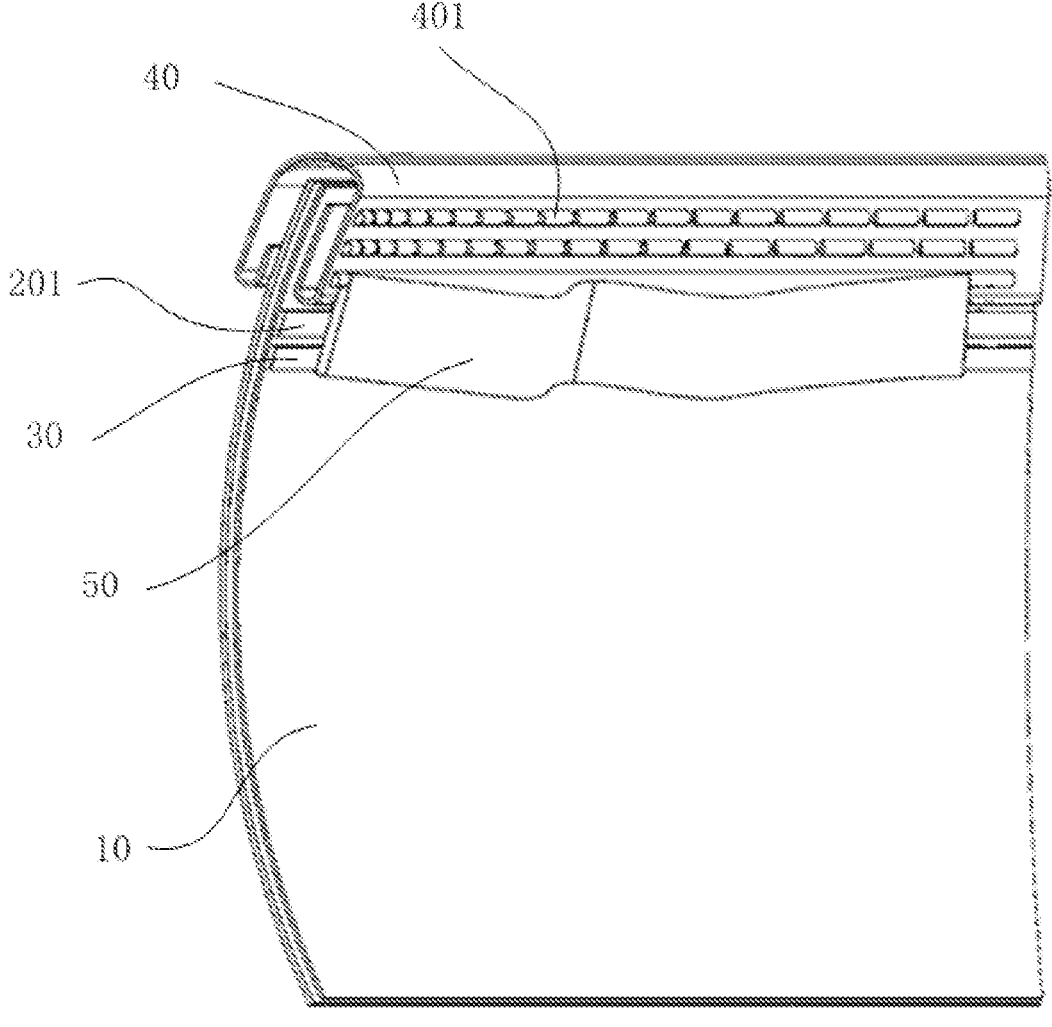
FIG. 4 schematically shows assembly details of the mask.

FIG. 1 schematically shows a mask 1 according to an embodiment of the present application. FIG. 4 shows the assembly details of the mask 1. As shown in FIGS. 1 and 4, the mask 1 includes a mask body 10 with filtering performance and a flexible support frame 20. The support frame 20 is arranged in the mask body 10 and is connected to at least part of the mask body 10. The mask body 10 includes a first filter area 101 corresponding to the support frame 20 and a second filter area 102 surrounding the support frame 20. While the mask 1 is worn, the support frame 20 supports the mask body 10, so that the first filter area 101 and at least part of the second filter area 102 are spaced apart from the wearer's face.

Figure 2:
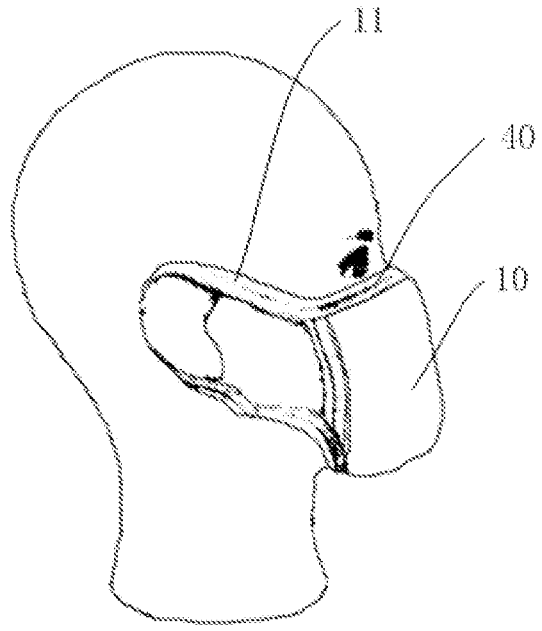
FIG. 2 schematically shows a state of the mask when the mask is worn on a user's face.

Generally, when the mask 1 according to the present application is worn, the support frame 20 is supported on the wearer's face, and the nose-bridge and the mouth of the wearer correspond to the support frame 20 (or the first filter area 101). The wearer pinches the support frame 20 to adapt it to the nose-bridge and other facial features of the wearer and deform it into a three-dimensional shape (e.g., a cage or bowl shape). Accordingly, the mask body 10 forms a cup shape (as shown in FIG. 2) by the supporting action of the support frame 20, so that the whole first filter area 101 and at least part (for example, a part adjacent to the first filter area 101) of the second filter area 102 of the mask body 10 are spaced apart from the wearer's face (that is, a dead space of the mask 1 is formed), allowing outside air after filtered to flow into the dead space for the wearer to breathe. However, the mask in the prior art closely fits the wearer's face without forming a large-enough dead space. Compared with the mask in the prior art, the filter area of the mask 1 according to the present application is significantly larger, and the wearer's breathing is also smoother. In addition, the support frame 20 closely fits the face, so that the mask 1 is stably supported on the wearer's face, which also improves the filtering effect of the mask 1. When the mask 1 is manufactured, the mask body 10 is developed and maintained as a planar shape by the planar support frame 20, which facilitates the manufacturing of the mask 1.

In addition, it should be understood that the mask 1 further includes earloops 11 connected to the mask body 10 for ease of wear.

The structure of the support frame 20 is described in detail below.

Figure 5:
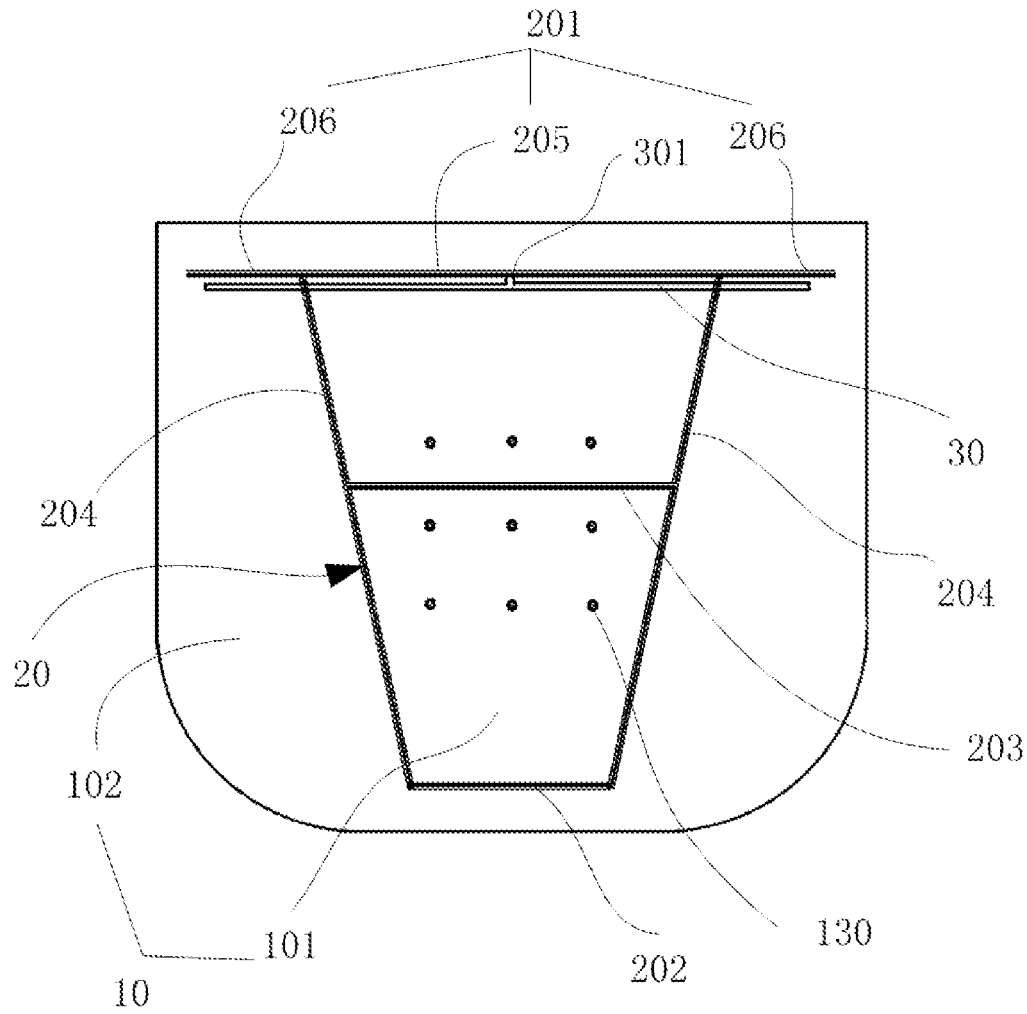
FIG. 5 schematically shows the developed view of the first set of filter layers and/or the second set of filter layers of the mask body, and also shows the position of a support frame in the mask body.

As shown in FIG. 5, the support frame 20 includes a first rod 201 extending laterally, a second rod 202 arranged below the first rod 201 and extending laterally, and at least two connecting rods 204 connected between the first rod 201 and the second rod 202. The at least two connecting rods 204 are laterally spaced apart. In this way, the first rod 201, the second rod 202, and the at least two connecting rods 204 form a closed shape. The support frame 20 with a closed shape has a relatively stable structure and a large support range, which helps to maintain the shape of the mask body 10. Therefore, the mask 1, when is worn, has a stable dead space, which improves the filtering effect of the mask 1. In addition, when the mask 1 is worn, the first rod 201 is located below the wearer's eye sockets, the connecting rods 204 are bent to adapt to the shape of the face and are bent inwards to fit the mandible, and the second rod 202 is located below the mandible. Accordingly, the mask body 10 covers the wearer's face and mandible (as shown in FIG. 2). In this way, the wearer's nose, mouth, and mandible are all within the range of the support frame 20 and spaced apart from the mask body 10, so that an area of the mask body 10 corresponding to the nose, mouth, and mandible forms the dead space, which significantly increases the effective filtering area of the mask 1. In another embodiment, the support frame 20 may also be configured such that the length of the connecting rods 204 is relatively short, and accordingly, the second rod 202 may correspond to an area between the nose and mouth, to the mouth, or to the mandible, which will not be specifically described herein.

Alternatively, when the support frame 20 is combined with the mask body 10, the first rod 201 and the second rod 202 are connected with the mask body 10 (for example, by thermocompression bonding), while the connecting rods 204 are separated from the mask body 10. In this way, the mask body 10 has certain constraints on the support frame 20 but does not inhibit the deformation of the support frame 20. When the mask 1 is worn, the support frame 20 can still deform freely, but cannot be significantly displaced relative to the mask body 10, so that the support frame 20 can be easily aligned with the facial features of the wearer, facilitating the wearing of the mask 1.

It should be understood that the first rod 201 may be a single complete rod or a combination of a plurality of rods. In addition, the first rod 201 may be a straight rod or a bent rod. The second rod 202 and the connecting rods 204 are also similar to the first rod 201, which will not be repeated herein. In addition, each connecting rod 204 may be a vertically extending rod, or may include a vertically extending rod and a non-vertically extending rod. For example, when the support frame 20 is rectangular, the connecting rod 204 may be a vertically extending rod. When the support frame 20 is hexagonal, the connecting rod 204 may include two rods extending to form an angle of 120 degrees with the first rod 201 or the second rod 202. Alternatively, the support frame 20 may also have an inverted triangle shape.

Alternatively, in the embodiment shown in FIG. 5, the shape of the support frame 20 is an isosceles trapezoid with a long bottom edge being located above a short bottom edge. In this way, the support frame 20, as a whole, adapts to the contour of the wearer's face, improving the wearing comfort of the mask 1.

In order to further ensure the stability of the support frame 20, as shown in FIG. 5, the support frame 20 further includes a third rod 203 extending laterally. The third rod 203 is located between the first rod 201 and the second rod 202, and is connected with the connecting rods 204. When the mask 1 is worn, the third rod 203 is located on an outer side of the wearer's mouth, which can further maintain the distance between the two connecting rods 204 unchanged, and help to maintain the shape of the support frame 20 and the mask 1. The third rod 203 is also used to support the mask body 10. For example, when the wearer inhales, the third rod 203 is able to prevent the mask body 10 from collapsing and touching the wearer's nostrils and lips, and thus prevent the resulting reduction of the dead space. The reduction of the dead space results in a reduction of the filtering area of the mask 1. Alternatively, the third rod 203 is a median line of the isosceles trapezoid.

As further shown in FIG. 5, the first rod 201 includes a middle section 205 which is part of the closed shape and a lateral extension section 206 which is located outside the closed shape. In this structure, the lateral extension section 206 makes the connection between the support frame 20 and the mask body 10 more stable. Moreover, when the mask 1 is worn, the lateral extension section 206 is also deformed to adapt to the facial features, and supports the mask body 10, which improves tightness between the mask 1 and the wearer's face. When the mask 1 is manufactured, the lateral extension section 206 also helps to maintain the mask body 10 in a planar shape, which facilitates the manufacturing of the mask 1.

The length of the lateral extension section 206 can be determined based on the actual size of the mask body 10. For example, the lateral extension section 206 can extend laterally to a position which is at a distance of about 5-20 mm from the corresponding edge of the mask body 10.

Alternatively, two lateral extension sections 206 are provided, and are symmetrically located at two sides of the closed shape. In this way, the stress on the support frame 20 is kept balanced, which improves the wearing comfort of the mask 1, and helps to maintain the shape of the mask body 10.

Alternatively, the total length of the long bottom edge of the isosceles trapezoid and the lateral extension sections 206 is between 70-250 mm. For example, it may be 160 mm. The length of the short bottom edge of the isosceles trapezoid is between 10-100 mm. For example, it may be 50 mm. The length of each leg of the isosceles trapezoid is between 80-160 mm. For example, it may be 130 mm. It is found that the support frame 20 with this size adapts to the facial contours of most people, making mask 1 easy for users to wear.

Figure 6:
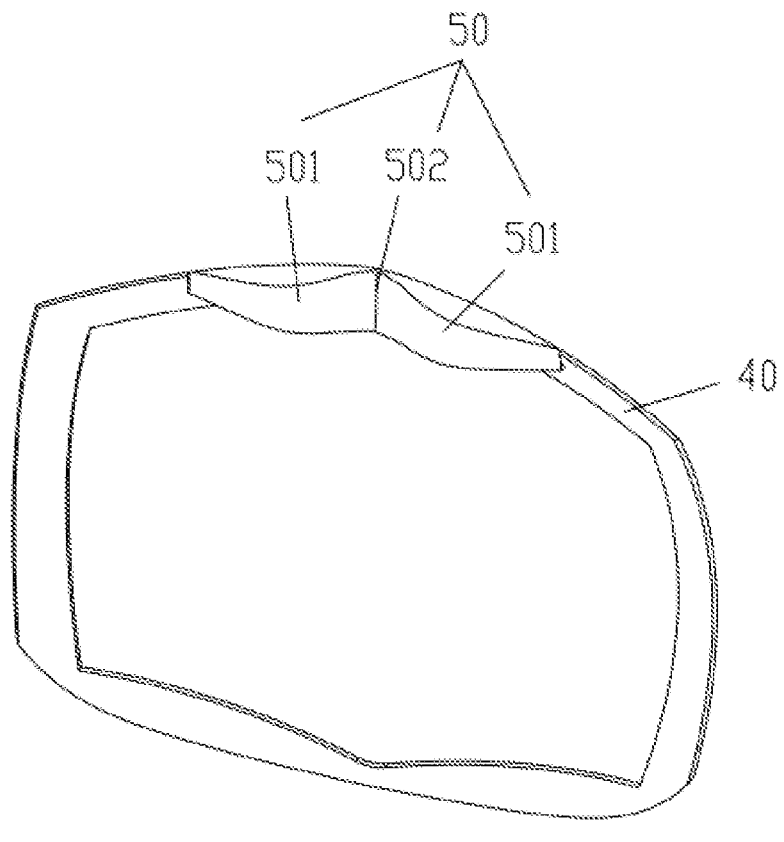
FIG. 6 schematically shows the structure of a wrapping strip and a gap filling strip.

As further shown in FIGS. 4 and 6, the mask 1 further includes a gap filling strip 50 adapted to fit with nose wings. The gap filling strip 50 is arranged on an inner surface of the mask body 10 and extends along an upper edge of the mask body 10. When the mask 1 is worn, the support frame 20 is deformed to support the mask body 10 to protrude outwards. The upper edge area of the mask body 10 is thus tilted towards the face of the wearer, while the middle part of the mask body 10 is away from the face of the wearer. Accordingly, the gap filling strip 50 is tilted towards the face and more closely fits the face area around the nose wings and nose bridge, which improves the tightness between the mask 1 and the wearer's face, and reduces the total leakage rate of the mask 1.

As shown in FIG. 6, the gap filling strip 50 may include two protrusions 501 protruding inwards and a recess 502 located between the two protrusions 501. In this way, the gap filling strip 50 more closely fits the physiological curved surfaces of the nose wings and nose bridge, which improves the wearing comfort of the mask 1 and tightness between the mask 1 and the wearer's face, and reduces the total leakage rate of the mask 1.

Alternatively, the gap filling strip 50 is made of closed-cell sponge. The closed-cell sponge is lightweight, soft, and airtight, which further enhances the wearing comfort of the mask 1 and improves the tightness between the mask 1 and the wearer's face. In another embodiment, the gap filling strip 50 may be made of flexible plastic. For example, the gap filling strip 50 may be made of silicone rubber, latex or the like.

As further shown in FIG. 5, the mask 1 further includes a deformable rod 30. The deformable rod 30 is separated from the mask body 10 and is adjacent to the first rod 201. According to this structure, when the mask 1 is worn, the deformable rod 30 is also deformed to adapt to the facial features and/or contour, and supports the mask body 10, while the support frame 20 is deformed to adapt to the facial features and/or contour.

As further shown in FIG. 4, a projection of the gap filling strip 50 towards the mask body 10 overlaps at least part of the deformable rod 30. The beneficial effects of this structure are as follows. Since the deformable rod 30 is not connected to the mask body 10, the tension applied by the mask body 10 on the deformable rod 30 is very small. When the mask 1 is worn and the deformable rod 30 has been deformed, if the mask body 10 is deformed due to external forces, the deformable rod 30 still maintains its deformed shape due to its independence of the mask body 10 and still applies pressure to the gap filling strip 50 to ensure good tightness between the wearer's nose bridge and both the gap filling strip 50 and the mask body 10.

Alternatively, the deformable rod 30 extends parallel to the first rod 201. In this way, while the first rod 201 is deformed to adapt to the facial features and/or contour, it is ensured that the deformable rod 30 is deformed following the deformation of the first rod 201. In addition, this structure also facilitates arranging the deformable rod 30 with reference to the first rod 201, especially in the case that the deformable rod 30 is connected to the first rod 201 (as described below), which facilitates the manufacturing of the mask 1.

Alternatively, the deformable rod 30 is arranged on a side, facing towards the second rod 202, of the first rod 201, and is located on an inner side of the connecting rods 204. In this way, the first rod 201 defines an accommodating space for the deformable rod 30 inside the mask body 10, which further reduces the tension applied by the mask body 10 on the deformable rod 30. In addition, since the deformable rod 30 is located on the inner side of the connecting rods 204, the deformable rod 30 is closer to the face than the connecting rods 204. This structure ensures the independence of the deformable rod 30. For example, when the mask 1 is worn, the outward bending and deformation of the connecting rods 204 do not lead to the outward bending and deformation of the deformable rod 30. In other words, when the connecting rods 204 are bent and deformed outwards, the deformable rod 30 does not deform following the deformation of connecting rods 204, which also improves the tightness between the mask body 10 and the wearer's face.

In addition, in the case that the first rod 201 has a middle section 205 and two lateral extension sections 206, the deformable rod 30 is configured to extend laterally beyond the middle section 205 of the first rod 201, but not beyond the two lateral extension sections 206. In this way, the deformable rod 30 is relatively long, which also improves its support effect on the mask body 10 and the pressure exerted on the gap filling strip 50, ensuring good tightness between the wearer's nose bridge and both the gap filling strip 50 and the mask body 10.

As further shown in FIG. 5, the deformable rod 30 is connected to the first rod 201 at least at its middle 301. In this way, the deformable rod 30 and the support frame 20 form an integral component, facilitating their installation. In addition, the deformable rod 30 is connected to the first rod 201 only at its middle, so that two ends of the deformable rod 30 are still relatively independent from the support frame 20. The deformable rod 30 is thus able to support the mask body 10 independently of the support frame 20 and keep the mask body 10 protruded, so that the filtering area of the mask 1 does not significantly decrease, and the tightness between the mask body 10 and the face of the wearer is also well maintained. In an embodiment, the deformable rod 30 is connected to the support frame 20 at the middle by thermocompression bonding or a chemical adhesive. In another embodiment, the deformable rod 30 and the support frame 20 are integrally formed by injection molding.

Alternatively, both the support frame 20 and the deformable rod 30 are made of plastic strips with shape memory functions. The deformable rod may also be made of a metal strip (such as plastic-wrapped iron wire or flat aluminum strip, etc). In this way, when the mask 1 is worn, the support frame 20 and the deformable rod 30 can maintain their deformed shapes, thereby maintaining the support effect on the mask body 10 and the pressure exerted on the gap filling strip 50. In a specific embodiment, the material of the plastic strip is polyolefin. In this way, the support frame 20 and the deformable rod 30 are lighter, reducing the pressure on the wearer.

Alternatively, the width of the plastic strip is between 0.5-6 mm. For example, it may be 3 mm. In this way, both the support frame 20 and the deformable rod 30 have small areas, so that the ventilation and filtering effects of the mask body 10 are not affected. In addition, both the support frame 20 and the deformable rod 30 are arranged within the mask body 10 without directly contacting with the wearer's face, which avoids pressure sores developing on the wearer's face.

Figure 3:
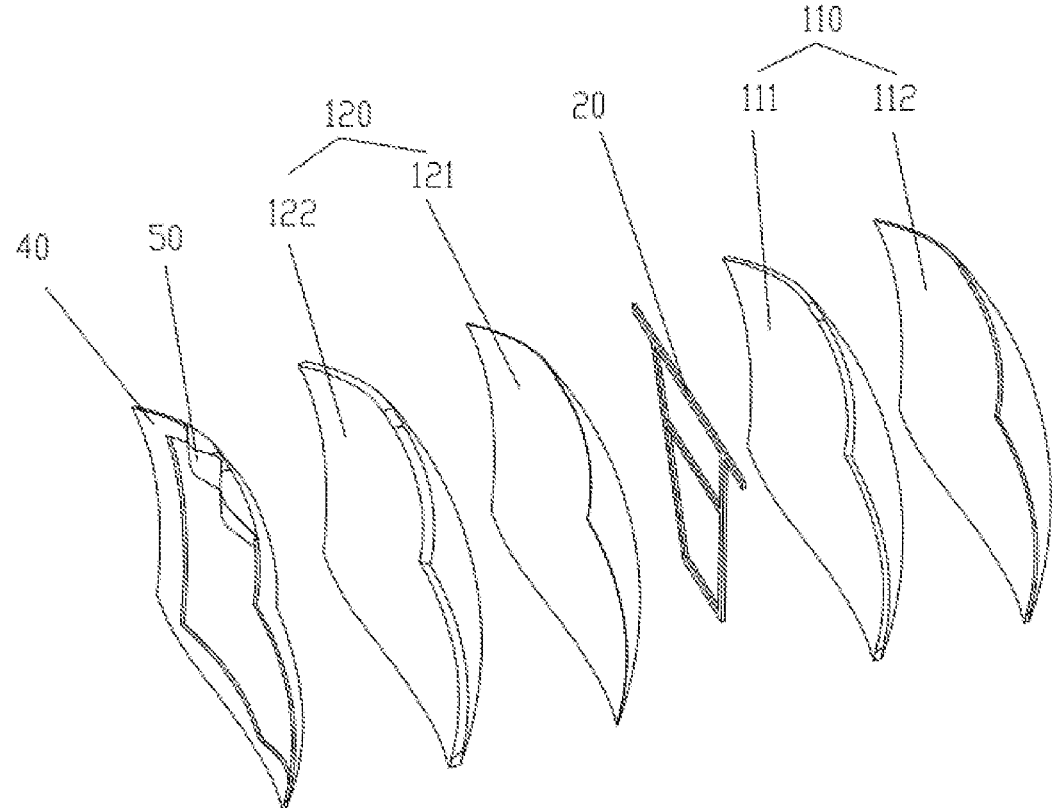
FIG. 3 is an exploded view of a mask body.

FIG. 3 is an exploded view of the mask body 10 of the mask 1. As shown in FIG. 3, the mask body 10 includes a first set of filter layers 110 located on an outer side of the support frame 20 and a second set of filter layers 120 located on an inner side of the support frame 20. The first set of filter layers 110 and the second set of filter layers 120 are connected into an integral body at their edges via an elastic wrapping strip 40. The wrapping strip 40 protects the edges of the first set of filter layers 110 and the second set of filter layers 120.

Alternatively, the upper edge of the gap filling strip 50 covers at least a portion of the lower edge of the wrapping strip 40. In this way, when the mask 1 is worn, as the wrapping strip 40 is tensioned, the wrapping strip 40 pushes the gap filling strip 50 to tilt towards the wearer's face to fit more closely with the nose wings and the face area around the nose bridge, which improves the tightness between mask 1 and the wearer's face and reduces the total leakage rate of the mask 1.

Alternatively, the elastic wrapping strip 40 leads to a plurality of wrinkles at the edges of the mask body 10. For example, the deformation and shrinkage of the elastic wrapping strip 40 leads to a plurality of wrinkles at the edges of the mask body 10. The wrinkles also help to increase the filtering area of the mask 1. In addition, when the mask 1 is worn, the elastic wrapping strip 40 is deformed to adapt to the contour of the face and maintains close contact with the face, which avoids excessive pressure on the wearer's face, ensures good tightness between the mask 1 and the wearer's face, and is also convenient for the wearer to open his mouth and speak. This improves the wearing experience of the mask 1. Alternatively, the elastic wrapping strip 40 may be made of elastic materials such as knitted fabrics and rib fabrics (such as cotton spandex rib fabrics). Those materials are well known to those skilled in the art and will not be described herein.

Alternatively, the width of the wrapping strip 40 is between 5-20 mm. For example, it may be ½ inch (12.7 mm). In this way, the contact area between the wrapping strip 40 and the face is relatively large, which helps to suppress or even eliminate the formation of indentation or pressure sores on the face, and improves the wearing experience of the mask 1.

In an embodiment, the wrapping strip 40 and the earloops 11 are made of the same material and are sewn into an integral body. In addition, the earloops 11 may contain phosphorus-nitrogen flame retardant, such as the ammonium polyphosphate flame retardant. The phosphorus-nitrogen flame retardant does not affect the elasticity of the earloops 11. Alternatively, the filter membrane layer 111 in the mask body 10 may be made of expanded PTFE (i.e., polytetrafluoroethylene). In this way, when the mask 1 is incinerated, the phosphorus-nitrogen flame retardant is decomposed to produce ammonia, and the expanded PTFE is decomposed to produce hydrogen fluoride. These two products can react to produce ammonium fluoride. The nitrogen element in the ammonium fluoride can be absorbed by plants, and the fluorine element can be combined with calcium into calcium fluoride. Thus, the harmless treatment of the mask 1 is achieved, which is conducive to environmental protection.

Alternatively, the first set of filter layers 110, the second set of filter layers 120 and the wrapping strip 40 are sewn together. In this way, the mask 1 can be easily manufactured by sewing, reducing the difficulty of manufacturing the mask 1. In a specific embodiment, a sewing process of three-needles-four-threads can be used, which can form the mask body 10 into a curved shape that matches the human face and improve the wearing comfort of the mask 1. The sewing process of three-needles-four-threads (ISO 4915-407) is already known to those skilled in the art and will not be described herein.

In the case that the first set of filter layers 110, the second set of filter layers 120 and the wrapping strip 40 are sewn together, the wrapping strip 40 is coated with a flexible adhesive to seal the sewing stitch 401. The flexible adhesive is able to prevent contaminants in the environment from passing through the sewing stitch and improves the tightness between the mask 1 and the wearer's face. In addition, when the wrapping strip 40 is stretched or retracted, the flexible adhesive can be correspondingly stretched or retracted without being damaged, thereby maintaining the sewing stitch is sealed. Alternatively, the flexible adhesive may be rubber, vulcanized silicone rubber, silicone rubber, foamed silicone rubber, latex, and so on. Those materials are already known to those skilled in the art and will not be described here.

Alternatively, as shown in FIG. 3, the first set of filter layers 110 includes the filter membrane layer 111 adjacent to the support frame 20 and a first hydrophobic cloth layer 112 adjacent to the filter membrane layer 111. The second set of filter layers 120 includes a second hydrophobic cloth layer 121 adjacent to the support frame 20 and a hydrophilic cloth layer 122 adjacent to the second hydrophobic cloth layer 121. Alternatively, the first hydrophobic cloth layer 112 may be made of, for example, hydrophobic fibers. The filter membrane layer 111 may be made of common electrostatic melt blown cloth, electrostatic melt blown cloth containing expanded PTFE (i.e., polytetrafluoroethylene), or a filter membrane composed of a PP (i.e., polypropylene) filament spinning layer, polylactic acid, polyacrylamide, a PTFE layer, and PP spunbonded cloth. Those materials are already known to those skilled in the art and will not be described here. The material of the second hydrophobic cloth layer 121 may, for example, be the same as or similar to the material of the first hydrophobic cloth layer 112, or the same as or similar to the material of the filter membrane layer 111. The hydrophilic cloth layer 122 may be made of linen cloth or cotton cloth, such as knitted cotton cloth, gauze cloth, plain cotton cloth, or rib cotton cloth. Those skilled in the art can choose appropriate materials as needed.

Alternatively, the filter membrane layer 111 may be in the form of a single layer, or in the form of two or more layers, which depends on the application environment of the mask 1.

Alternatively, the hydrophilic cloth layer 122 may further contain chemical agents. This helps to remove certain toxic and harmful gases in the air, which is already known to those skilled in the art and will not be described here.

Alternatively, as shown in FIG. 5, the first set of filter layers 110 and the second set of filter layers 120 are connected together through a plurality of discretely distributed fixing points 130. In this way, the first set of filter layers 110 and the second set of filter layers 120 form an integral body. When the mask 1 is worn, the first set of filter layers 110 pulls the second set of filter layers 120, which prevents the hydrophilic cloth layer 122 of the second set of filter layers 120 from moving towards the face and attaching to the wearer's nostrils during breathing, and also prevents the second set of filter layers 120 from floating freely along with exhalation and/or inhalation. In an embodiment, the first set of filter layers 110 and the second set of filter layers 120 are connected together by thermocompression bonding or a chemical adhesive.

The mask 1 of this application has been tested as follows.

Test conditions: The mask 1 of this application is worn on a rubber head mold with a head circumference of 60 cm. Then, gas is supplied between the mask 1 and the head mold at a flow rate of 30 ml/min, and detection of the contact pressure between the edges of the mask 1 and the head mold is performed. If the contact pressure at any test point between the edges of the mask 1 and the head mold is less than 0.05 kPa, it indicates that the mask is not tightly fitted to the head mold, and there is a risk of air leakage. Table 1 shows the test results.

In addition, the particle protection performance of the mask 1 was tested. The testing method is as follows. Non-oily particle test was conducted according to GB2626-2019 KN95 (sodium chloride particles). The total inward leakage (TIL), exhalation resistance, inhalation resistance, dead space, and flammability of the mask 1 were also tested according to GB2626-2019 KN95. Table 2 shows the test results.

TABLE 1

| Tested Position | Cup | | | |
| --- | --- | --- | --- | --- |
| Test Results | Upper Edge (kPa) | Left Edge (kPa) | Right Edge (kPa) | Lower Edge (kPa) |
| Test Point 1 | 0.85 | 0.6 | 1.1 | 1.3 |
| Test Point 2 | 1.1 | 0.1 | 0.3 | 0.97 |
| Test Point 3 | 1.5 | 0.1 | 0.3 | 0.2 |
| Test Point 4 | 0.4 | 0.22 | 0.4 | 0.6 |
| Test Point 5 | 2.5 | 0.29 | 0.25 | 0.65 |
| Test Point 6 | 1 | 0.5 | 0.15 | 0.9 |
| Test Point 7 | 0.55 | 0.9 | 0.25 | 0.95 |
| Test Point 8 | 0.5 | | | 1.5 |
| Test Point 9 | 0.55 | | | 1.15 |
| Test Point 10 | 0.8 | | | 0.85 |
| Test Point 11 | 0.85 | | | 1.55 |
| Test Point 12 | 0.55 | | | 2.9 |
| Test Point 13 | 0.75 | | | |
| Test Point 14 | 1.2 | | | |
| Test Point 15 | 1.3 | | | |
| Test Point 16 | 0.2 | | | |
| Test Point 17 | 0.6 | | | |
| Test Point 18 | 1.4 | | | |
| Test Point 19 | 0.7 | | | |
| Test Point 20 | 1.4 | | | |
| Number of test points where the contact pressure is lower than 0.05 kPa | 0 | 0 | 0 | 0 |

TABLE 2

| Test conditions: | Technical Requirements of GB2626-2019 KN95 | Test Results | Evaluation of Single Item |
| --- | --- | --- | --- |
| After mechanical, temperature and humidity pretreatment to the mask, filtration efficiency (FE-N) is tested by accumulatively loading a total of 200 mg of non-oily particles | ≥95% | ≥95.3% | Qualified |

TABLE 2-continued

| Test conditions: | Technical Requirements of GB2626-2019 KN95 | Test Results | Evaluation of Single Item |
|---|---|---|---|
| Total Inward Leakage (TIL) | Requirement 1: In the case that the TIL of each action (10 people × 5 actions) is used as evaluation basis, TIL ≤ 11% for at least 46 actions out of 50 actions | TIL < 11% for 49 actions | Qualified |
| | Requirement 2: In the case that the overall TIL of a person is used as evaluation basis, at least 8 out of 10 persons have an overall TIL of ≤ 8% | TIL < 8% for 9 persons | Qualified |
| Inhalation resistance @ 85 L/min (Pa), no exhalation valve | ≤210 | 132 | Qualified |
| Exhalation resistance @ 85 L/min (Pa), no exhalation valve | ≤210 | 97 | Qualified |
| Dead space @ 5% $CO_2$ | ≤1% | 0.7% | Qualified |
| Flammability | Remaining combustion time after leaving the flame ≤ 5 s | Non-inflammable | Qualified |

According to the test results in Table 1, the contact pressure at any test point is greater than or equal to 0.05 kPa, which indicates that the tightness between the mask 1 of the present application and the wearer's head is excellent when the mask is worn.

According to the test results in Table 2, all indicators of the mask 1 according to the present application meet the requirements of GB2626-2019 KN95.

The above only describes the embodiments of the present application and is not intended to limit the present application. For those skilled in the art, various modifications and changes can be made to the present application. Any modifications, equivalent substitutions or improvements made within the spirit and principle of the present application shall fall within the scope of protection defined by the appended claims of the present application.

The invention claimed is:

1. A mask, comprising:

a mask body with filtering performance, wherein the mask body comprises a filter membrane layer which is made of expanded PTFE; and a flexible support frame, wherein the support frame is arranged in the mask body and connected to the mask body, and the mask body comprises a first filter area corresponding to the support frame and a second filter area surrounding the support frame;

wherein while the mask is in use, the support frame supports the mask body, so that the first filter area and at least part of the second filter area are spaced apart from a user's face;

wherein the support frame comprises a first rod extending laterally, a second rod arranged below the first rod and extending laterally, and at least two connecting rods connected between the first rod and the second rod and laterally spaced apart; and the first rod, the second rod, and the at least two connecting rods are combined as a closed shape; wherein the closed shape is an isosceles trapezoid with a long bottom edge being located above a short bottom edge; and wherein the support frame further comprises a third rod extending laterally, and the third rod is located between the first rod and the second rod, and is connected with the connecting rods;

wherein the mask further comprises a gap filling strip adapted to fit with nose wings, and the gap filling strip is arranged on an inner surface of the mask body and extends along an upper edge of the mask body;

wherein the mask further comprises a deformable rod, and at least a middle section of the deformable rod is connected to the first rod, and wherein the deformable rod is separated from the mask body and is adjacent to the first rod; and a projection of the gap filling strip towards the mask body overlaps with at least part of the deformable rod; and wherein the support frame and the deformable rod are made of plastic strips.

2. The mask according to claim 1, wherein the gap filling strip comprises two protrusions protruding inwards and a recess located between the two protrusions.

3. The mask according to claim 1, wherein the gap filling strip is made of closed-cell sponge or flexible plastic.

4. The mask according to claim 1, wherein the deformable rod is arranged on a side of the first rod facing towards the second rod, and is located on an inner side of the connecting rods.

5. The mask according to claim 1, wherein the first rod comprises a middle section which is part of the closed shape and lateral extension sections which are located outside the closed shape; and the deformable rod extends laterally beyond the middle section of the first rod, but does not extend beyond the lateral extension sections.

6. The mask according to claim 1, wherein the mask body comprises a first set of filter layers located on an outer side of the support frame and a second set of filter layers located on an inner side of the support frame, wherein the first set of filter layers and the second set of filter layers are connected into a whole at an edge via an elastic wrapping strip.

7. The mask according to claim 6, wherein the first set of filter layers, the second set of filter layers and the wrapping strip are sewn together; and the wrapping strip is coated with a flexible adhesive to seal sewing stitch.

8. The mask according to claim 6, wherein the filter membrane layer is one of the first set of filter layers and adjacent to the support frame, and wherein the first set of filter layers further comprises a first hydrophobic cloth layer adjacent to the filter membrane layer; and the second set of filter layers comprises a second hydrophobic cloth layer adjacent to the support frame and a hydrophilic cloth layer adjacent to the second hydrophobic cloth layer.

9. The mask according to claim 6, wherein the first set of filter layers and the second set of filter layers are connected together through a plurality of discretely distributed fixing points.

10. The mask according to claim 6, wherein a plurality of wrinkles are formed at edges of the mask body.

\* \* \* \* \*